US012750173B2

(12) United States Patent
Ozozlu

(10) Patent No.: US 12,750,173 B2
(45) Date of Patent: Sep. 29, 2026

(54) TROPOSPHERIC DUCTING INTERFERENCE MITIGATION IN A WIRELESS

(71) Applicant: T-MOBILE INNOVATIONS LLC, Overland Park, KS (US)

(72) Inventor: Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 290 days.

(21) Appl. No.: 18/670,343

(22) Filed: May 21, 2024

(65) Prior Publication Data

US 2025/0365105 A1 Nov. 27, 2025

(51) Int. Cl.
*H04L 5/00* (2006.01)
*H04W 72/542* (2023.01)

(52) U.S. Cl.
CPC .......... *H04L 5/0035* (2013.01); *H04L 5/0062* (2013.01); *H04W 72/542* (2023.01)

(58) Field of Classification Search
CPC ... H04L 5/0035; H04L 5/0062; H04W 72/542
See application file for complete search history.

(56) References Cited

U.S. PATENT DOCUMENTS

2018/0206253 A1* 7/2018 Yun ........................ H04L 5/0051
2021/0321416 A1* 10/2021 Gaal .......................... H04L 5/14
2021/0385048 A1* 12/2021 Ren ........................ H04W 24/08

OTHER PUBLICATIONS

Oni, Phillip B., and Steven D. Blostein. "User-access point association for high density mimo wireless lans." arXiv preprint arXiv: 2408.14378 (2024). (Year: 2024).*

* cited by examiner

*Primary Examiner* — Sharad Rampuria
(74) *Attorney, Agent, or Firm* — SHOOK, HARDY & BACON L.L.P.

(57) ABSTRACT

Methods for mitigating the effects of an atmospheric-based interference event on the propagation of a radio frequency signal are provided. A wireless communication network can determine that tropospheric ducting interference is occurring, causing radio frequencies to travel much further than anticipated. In response to the determination of tropospheric ducting interference, the system dynamically adjusts the special subframe configurations within a victim base station. The system switches from a high downlink/uplink capacity special subframe configuration to a special subframe configuration designed to limit the tropospheric ducting interference. This switch increases the guard period between transmissions, thereby reducing signal overlap and mitigating interference from tropospheric ducting.

13 Claims, 4 Drawing Sheets

TROPOSPHERIC DUCTING INTERFERENCE MITIGATION IN A WIRELESS

SUMMARY

The present disclosure is directed to mitigating time of flight interference, substantially as shown and/or described in connection with at least one of the Figures, and as set forth more completely in the claims.

According to various aspects of the technology, tropospheric ducting can cause radio signals associated with a wireless communication network to travel farther than intended, to a location or area that is undesirable. This time of flight (TOF) interference causes degraded user experiences at a distant, victim base station. To mitigate this time of flight interference, the special subframe (SSF) configuration for the victim base station can be modified. When time of flight interference is reduced, the modified SSF configuration of the victim base station is switched back to the original SSF configuration.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
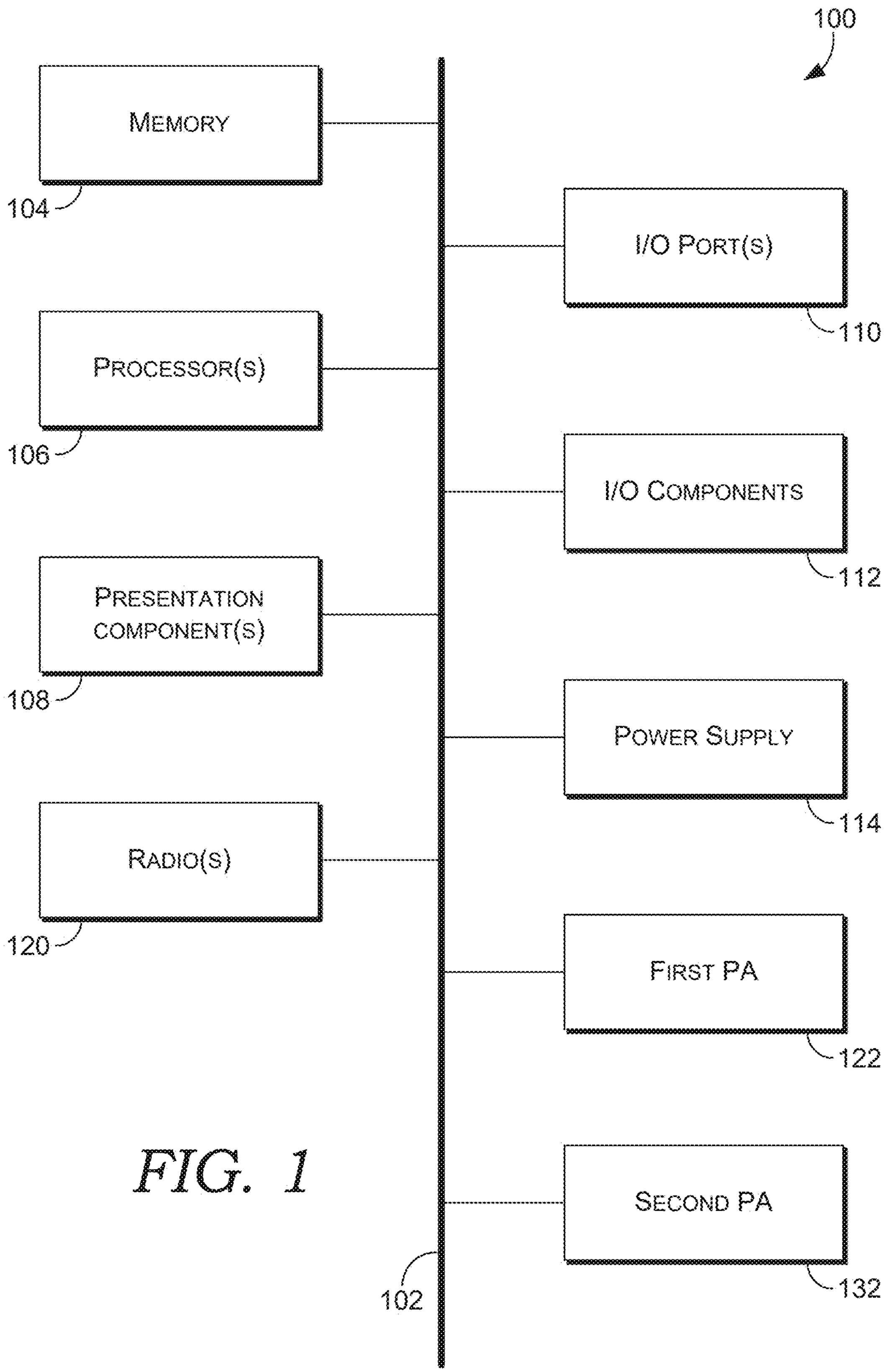
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to network access technology for the provision of wireless telecommunication services from a base station to one or more electronic devices, such as an eNodeB, gNodeB, etc. The term "cell" is used to describe one or more hardware and software components of a base station that are configured to provide wireless communication service to a geographic area.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, TOF interference occurs where radio frequency signals from a wireless communication network are received much farther from the transmitter than desired. In some cases, signals intended to cover distances of 10 miles or less can travel much further, extending dozens or even hundreds of miles. The primary cause of this extended reach is tropospheric ducting—meteorological condition that is often times characterized by alternating layers of warm and cold air at various altitudes. When colder layers encapsulate a layer of warm air, it forms a duct that effectively traps these signals, enabling them to travel much further than intended. This phenomenon can lead to significant interference and deteriorate the user experience.

Conventionally, systems and methods capable of addressing radio frequency signal interference resulting from tropospheric ducting include weather forecasting potential tropospheric ducting events and taking measures to optimize network configurations in order to temporarily minimize interference during the events. Specifically, when weather conditions are ideal one or more antennas on a base station can be tilted to avoid intercepting interfering frequencies from a distant base station, or the amount of transmitting power used by an antenna to maintain a stable link can be adjusted. The adjustments that can be made to the network configurations are limited, however. Operators must work within certain limitations of the wireless network. In addition, the nature of tropospheric ducting is unstable. Tropospheric ducting is highly dependent on weather conditions and atmospheric temperature profiles. It can occur unexpectedly and is challenging to predict accurately. This unpredictability can make it difficult to plan and manage wireless communication systems effectively. Even if predicted or detected quickly and accurately, because conventional solutions to mitigating time of flight interference in a cell involve reconfigurations of antenna or signal propagation characteristics, they are slow to implement, imprecise, and can have undesirably inadvertent consequences (e.g., reducing an area served by a cell due to a downtilt).

Unlike conventional solutions, this disclosure presents a system that detects increases in TOF interference at a base station, predominantly due to tropospheric ducting, and adjusts the SSF configurations of the base station. This approach utilizes SSF reconfiguration to increase the guard period of the SSF by integrating additional gap symbols. By increasing the guard period of the SSF, interference caused by tropospheric ducting is reduced. Specifically, the system continuously monitors specific metrics indicative of TOF interference. Upon detecting elevated TOF interference levels, the system triggers a dynamic switch from a high-capacity SSF configuration to one with a greater number of gap symbols. This switch allows signals from an aggressor base station to decay, reducing signal overlap and TOF interference.

Accordingly, a first aspect of the present disclosure provides a system for mitigating interference caused by tropospheric ducting in a wireless communication network. The system comprises one or more computer processing components configured to perform operations. The operations comprise first monitoring one or more metrics associated with a victim base station. The operations next comprise, determining that at least one of the one or more metrics has exceeded a pre-determined threshold. The operations further comprise determining that time of flight interference is occurring at a victim base station based at least in part on the at least one of the one or more metrics exceeding the pre-determined threshold. The operations additionally comprise, determining that the victim base station is communicating using a first SSF symbol configuration. The operations finally comprise causing the victim base station to switch from the first SSF symbol configuration to a second SSF symbol distribution where the second SSF symbol configuration comprises more gap symbols than the first SSF symbol configuration based on the determination that time of flight interference is occurring and that the victim base station is communicating using the first SSF symbol configuration.

A second aspect of the present disclosure provides a method for mitigating interference caused by tropospheric ducting in a wireless communication network. The method comprises first monitoring one or more metrics associated with a victim base station. The method next comprises determining that at least one of the one or more metrics has exceeded a pre-determined threshold. The method further comprises determining that time of flight interference is occurring at a victim base station based at least in part on the at least one of the one or more metrics exceeding the pre-determined threshold. The method additionally comprises determining that the victim base station is communicating using a first SSF symbol configuration. The method finally comprises causing the victim base station to switch from the first SSF symbol configuration to a second SSF symbol distribution based on the determination that time of flight interference is occurring and that the victim base station is communicating using the first SSF symbol configuration.

Another aspect of the present disclosure is directed to a non-transitory computer readable media having instructions stored thereon that, when executed by one or more computer processing components, cause the one or more computer processing components to perform a method for mitigating interference caused tropospheric ducting in a wireless telecommunication network. The method comprises first monitoring one or more metrics associated with a victim base station. The method next comprises determining that at least one of the one or more metrics has exceeded a pre-determined threshold. The method further comprises determining that time of flight interference is occurring at a victim base station based at least in part on the at least one of the one or more metrics exceeding the pre-determined threshold. The method additionally comprises, determining that the victim base station is communicating using a first SSF symbol configuration. The method finally comprises causing the victim base station to switch from the first SSF symbol configuration to a second SSF symbol distribution based on the determination that time of flight interference is occurring and that the victim base station is communicating using the first SSF symbol configuration.

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 can be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 can be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which can be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there can be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g., a second transmitter). Illustrative wireless telecommunications technologies include CDMA, GPRS, TDMA, GSM, and the like. The radio 120 can carry wireless communication functions or operations using any number of desirable wireless communication protocols, including 802.11 (Wi-Fi), WiMAX, LTE, 3G, 4G, LTE, 5G, NR, VOLTE, or other VOIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
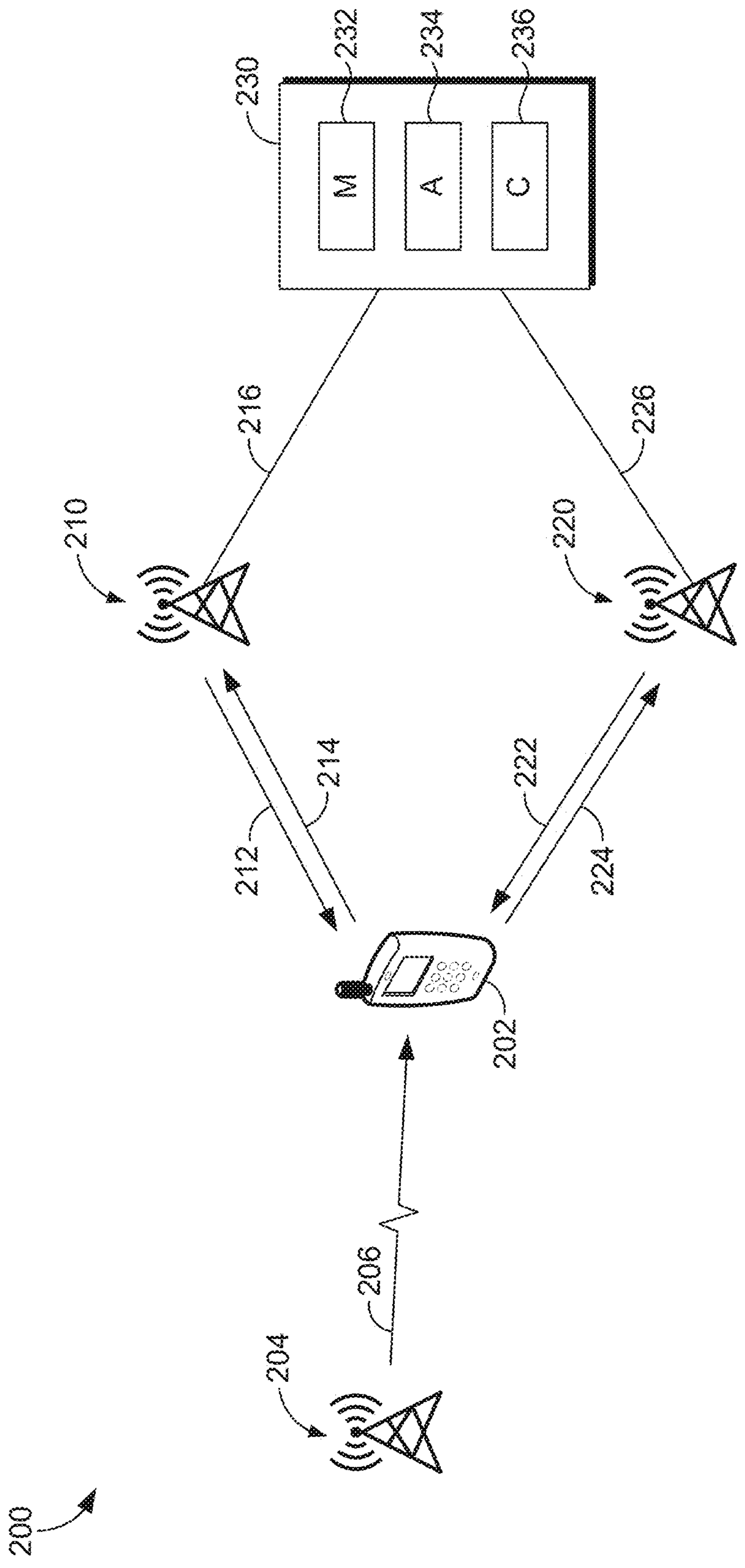
FIG. 2 depicts a network environment in which implementations of the present disclosure can be employed, in accordance with aspects herein.

Turning now to FIG. 2, an exemplary network environment is illustrated in which implementations of the present disclosure can be employed. Such a network environment is illustrated and designated generally as network environment 200. At a high level the network environment 200 comprises a UE 202, one or more base stations, and one or more networks. Though the UE 202 is illustrated as a cellular phone, a UE suitable for implementations with the present disclosure can be any computing device having any one or more aspects described with respect to FIG. 1. Similarly, though the one or more base stations are illustrated as macro cells on a cell tower, any scale or form of access point acting as a transceiver station for wirelessly communicating with a UE, including small cells, pico cells, and the like, are suitable for use with the present disclosure. The network environment 200 is but one example of a suitable network environment and is not intended to suggest any limitation as to the scope of use or functionality of the disclosure. Neither should the network environment 200 be interpreted as having any dependency or requirement to any one or combination of components illustrated.

The network environment 200 comprises one or more base stations to which the UE 202 can potentially connect to (also referred to as 'camping on', 'attaching' in the industry). Though the network environment 200 is illustrated with three distinct base stations, one skilled in the art will appreciate that more or fewer base stations can be present in any particular network environment suitable for use with the present disclosure. The one or more base stations of network environment 200 can comprise one or more of an aggressor base station 204, a victim base station 210, and a target base station 220. Each of the one or more base stations of the network environment 200 is configured to wirelessly communicate with UEs, such as the UE 202. In aspects, any of the one or more base stations can communicate with a UE using any wireless telecommunication protocol desired by a network operator, including but not limited to 3G, 4G, 5G, 6G, 802.11x and the like. Relevant to the present disclosure, each of the one or more base stations is associated with a network identifier (e.g., a Public Land Mobile Network (PLMN) number). Each of the one or more base stations can be generally said to be configured to communicate with one or more UEs located within a geographical area. A geographical area for any particular base station can be referred to as the "coverage area" of the base station or simply as a "cell." In some aspects, each cell is defined by an area in which signaling between a particular UE and the base station is usable for any purpose. Each of the base stations of the network environment 200 can be used to provide coverage to a plurality of cells, wherein one or more of the plurality of cells at least partially overlap; for example, the victim base station 210 can provide coverage to a first cell and a second cell, wherein the first cell and the second cell at least partially overlap. Generally, each base station of the one or more base stations can comprise one or more base transmitter stations, radios, antennas, antenna arrays, power amplifiers, transmitters/receivers, digital signal processors, control electronics, GPS equipment, and the like.

Each base station of the network environment 200 is configured to transmit downlink signals to one or more UEs, such as the UE 202 and to receive uplink signals therefrom. For the purposes of network environment 200, the victim base station 210 transmits downlink signals on a first downlink 212, the target base station 220 transmits downlink signals on a second downlink 222, the victim base station 210 receives uplink signals on a first uplink 214, the target base station 220 receives uplink signals on a second uplink 224, and the aggressor base station 204 transmits downlink signals on a third downlink 206.

Network environment 200 includes user equipment (UE) 202 configured to wirelessly communicate with the one or more base stations of the network environment 200. The UE 202 can take on a variety of forms, such as a personal computer (PC), a user device, a smart phone, a smart watch, an extended reality (XR) device, Internet of Things (IoT) device, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device that comprising any one or more feature of computing device 100 of FIG. 1.

In order to connect to any base station, the UE 202 must perform an active search to determine which base stations, if any, it is capable of connecting to. This process is known to many in the art and referred to herein as a cell search, and generally comprises acquiring time and frequency synchronization with a cell associated with a base station and detecting an identity of that cell by tuning to one or more specific frequencies, detecting/decoding synchronization signals, detecting/decoding a physical broadcast channel (PBCH), and detecting/decoding the physical downlink shared channel (PDSCH). When performing the cell search, a particular UE typically actively scans frequency bands in which it is capable of communicating for synchronization signals from a base station. Upon detection of synchronization signals from one or more base stations, the UE will perform a cell selection procedure (typically based on best quality of service metrics or finding a cell with a network identifier that matches its own), perform an attachment procedure with the base station, and then being carrying out a wireless communication session.

The network environment 200 additionally comprises one or more hardware and/or software components that, together, make up a TOF mitigation engine 230. The TOF mitigation engine 230 comprises a monitor 232, an analyzer 234, and a controller 236. The monitor 232 is generally configured to determine that TOF interference is taking place and affecting the ability of the UE 202 to utilize the victim base station 210. The analyzer 234 is generally configured to determine that the UE 202 is capable of connecting to the target base station 220 as an alternative to the victim base station 210. The controller 236 is generally configured to modify and communicate one or more synchronization signals from one or more of the victim base station 210 and the target base station 220 to the UE 202 that cause the UE 202 to select and attach to the target base station 220 instead of the victim base station 210.

In other aspects, the monitor 232 is generally configured to determine that TOF interference is taking place in a first cell, in which the UE 202 is located. Any suitable means for determining the existence of TOF interference would be suitable for use with the present disclosure, including the use of tropospheric ducting forecasts, observations of the third downlink 206 comprising a cell identifier of the aggressor base station 204 (combined with a determination that the aggressor cell 204 is located greater than a predetermined threshold distance from the first cell), or by determining that a signal parameter is different by a threshold value at a first portion of an uplink time period (e.g., an uplink symbol) when compared to a second, later, portion of the uplink time period.

Figure 3:
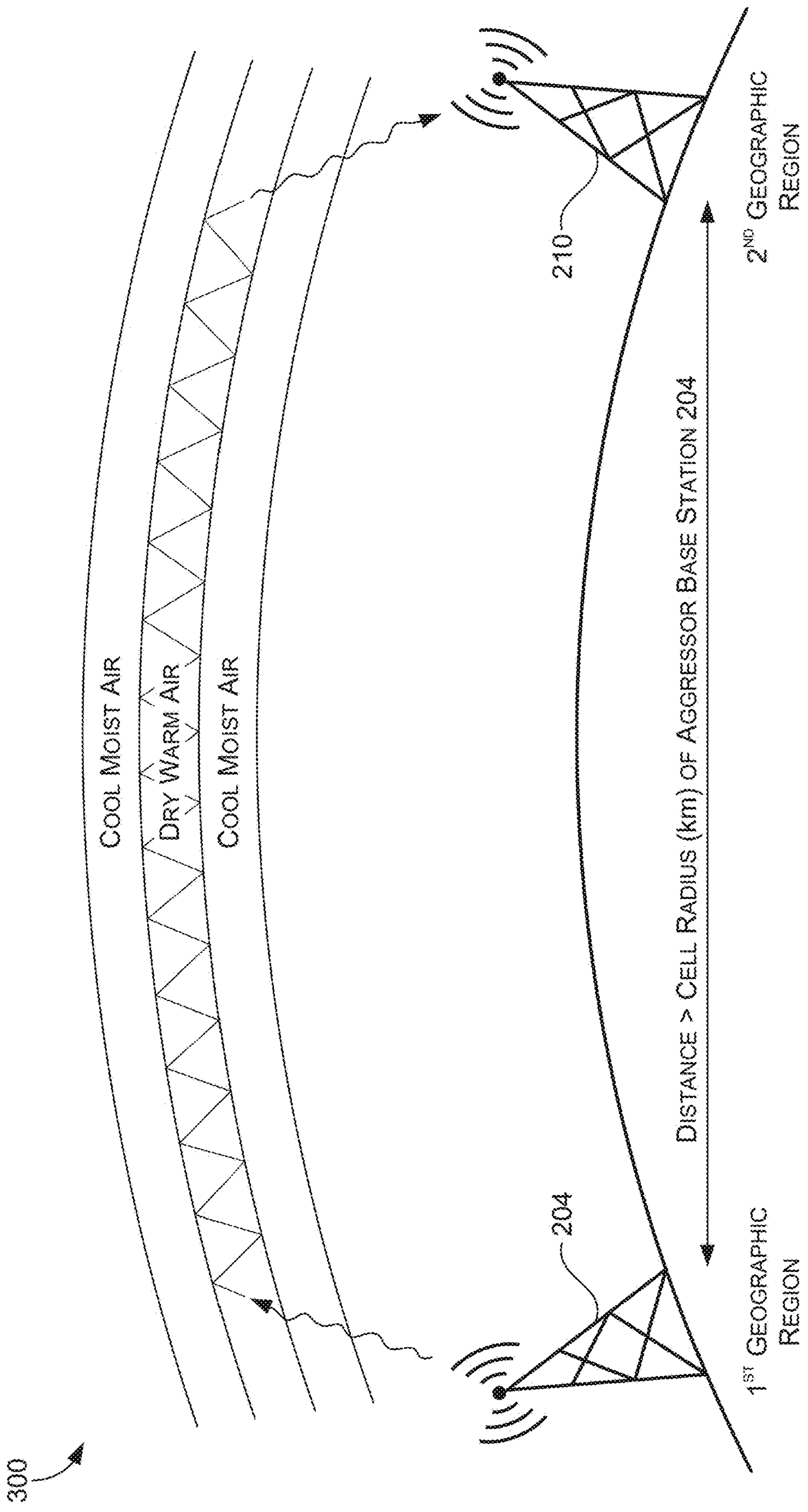
FIG. 3 depicts a diagram of tropospheric ducting occurring in a network environment.

An illustration of tropospheric ducting is presented in FIG. 3. As shown, the aggressor base station 204 of FIG. 2 can be located in the first geographic region and can broadcast radio frequency signals, which become trapped in a layer or duct of dry, warm air positioned in between layers of cool, moist air. These radio frequency signals travel a greater distance than intended, beyond the cell radius of the aggressor base station 204, to the victim base station 210, located in a second geographic region. When signals from the aggressor base station 204 are of sufficiently proximate frequencies, they can cause interference at the victim base station 210, particularly when the victim base station 210 utilizes TDD and the downlink signals from the aggressor base station 204 arrive during an uplink time period of the victim base station 210. That is, as the victim base station 210 can realize noise from the downlink signals of the aggressor base station 204 when the victim base station 210 is scheduled to be receiving uplink signals from a UE.

Returning to FIG. 2, the monitor 232 is configured to determine that TOF interference is affecting the victim base station 210 based on one or more signal parameters being different by a threshold value during different portions of an uplink time period (e.g., an uplink symbol). The monitor 232 can utilize observations of the one or more signal parameters by the victim base station 210 or measurement reports from one or more UEs within a predetermined threshold distance of the victim base station 210. The one or more signal parameters can comprise a signal strength, signal quality, or noise value (e.g., signal to interference noise ratio (SINR)). The monitor 232 can utilize a first observation of the one or more signal parameters at a first point in the uplink time period. In aspects, the first point in the uplink time period can be a configurable threshold amount of time from the beginning of the uplink time period. The monitor can compare the first observation to a second observation of the one or more signal parameters at a second point in the uplink time period. In aspects, the second point in the uplink time period is subsequent to the first point and can be a configurable threshold amount of time from the end of the uplink time period. For example, if the uplink time period is 10 ms, the first point can be 1 ms after the start of the uplink time period and the second point can be 8 ms after the start of the uplink time period. If one or more values of the one or more signal parameters at the first point are within a threshold range of the one or more values of the one or more signal parameters at the second point, the monitor 232 can determine that TOF interference is not occurring (or that it cannot be mitigated). If, on the other hand, the one or more values are beyond the threshold range, the monitor 232 can determine that TOF interference is occurring and communicate such an indication to the analyzer 234. In one non-limiting example, the one or more signal parameters can be SINR, channel quality indicator (CQI), or reference signal received power (RSRP). For example, the monitor 232 can compare the SINR at 1 ms and 8 ms in to a 10 ms uplink symbol. If the predetermined threshold range is 10 dB, a SINR of 5 dB is observed in the first cell at 1 ms, and a SINR of 20 is observed in the first cell at 8 ms, then the monitor 232 can determine that TOF interference is affecting the first cell. Conversely, if the SINR in the first cell is observed at 5 dB at 1 ms and 10 dB at 8 ms, then the monitor 232 can determine that TOF interference is not occurring (or it cannot be mitigated). In this case, the TOF mitigation engine 230 will take no further action.

In another aspect, the monitor 232 can determine that TOF interference is affecting the victim base station 210 based on the detection and determination that an uplink received signal strength indicator (UL RSSI) has exceeded a predetermined threshold and a subsequent or concurrent determination that an uplink block error rate (BLER) has exceeded a predetermined threshold. To determine this, the monitor 232 can be configured to monitor both UL RSSI and BLER parameters concurrently. If the monitor 232 determines that a rise in RSSI above a pre-determined threshold is followed by a rise in BLER beyond a pre-determined threshold within a specified period, the monitor 232 can determine that the victim base station 210 is experiencing TOF interference due to ducting effects. This determination is then relayed to the analyzer 234, which can initiate a sequence of remedial actions tailored to mitigate the interference.

The analyzer 234 is generally configured to initiate a TOF mitigation procedure for the victim base station 234 when the monitor 232 determines that TOF interference is occurring for the victim base station 232. The analyzer 234 is configured to proactively manage TOF interference for the victim base station 210 by altering SSF configurations within the victim base station 210 as necessary. Initially, the SSF provides sufficient time for the victim base station 210 to switch from transmitting to receiving. The SSF is divided into a downlink pilot time slot (DwPTS), a guard period (GP), and an uplink pilot time slot (UpPTS). The DwPTS is comprised of a number of downlink symbols, the GP of the SSF is comprised of a specific number of gap symbols, and the UpPTS is comprised of a specific number of uplink symbols. The configuration of the SSF can be dynamically changed to accommodate different conditions within the victim base station 210.

Initially, the victim base station 210 operates using a first SSF configuration, characterized by a specific number of downlink symbols, gap symbols, and uplink symbols. Once the monitor 232 determines that TOF interference is occurring at the victim base station 210, the analyzer 234 determines that a switch to a second SSF configuration is necessary, where the second SSF configuration includes more gap symbols than the first SSF configuration. By switching to the second SSF configuration, the number of gap symbols would increase, the guard period would increase, and the amount of TOF interference would be reduced. Specifically, with more gap symbols, the system allows more time for signals from the aggressor base station 204 to attenuate or propagate beyond the range of the victim base station's coverage area before signals are received or transmitted by the victim base station 210. This helps in minimizing the risk that a signal from the aggressor base station 204 will interfere with a signaling in the victim base station's 210 coverage area.

According to one aspect, the second SSF configuration comprises a larger number of gap symbols than the first SSF configuration. For example, if the first SSF configuration is a 6:4:4 configuration of downlink, gap, and uplink symbols, the second SSF configuration might be a 3:8:3 configuration, increasing the gap symbols while reducing the downlink and uplink symbols in the SSF. Alternatively, a second SSF configuration could adopt a 4:7:3 setup, or even a 2:9:3 configuration. Other SSF configurations that can be contemplated include a 5:6:3 or a 3:10:1 configuration. Additional SSF configurations can be employed and are envisaged within the scope of this disclosure.

The controller 236 is programmed to implement changes directed by the analyzer 234. When the analyzer 234 determines that, the predetermined thresholds are exceeded indicating TOF interference and that a switch in SSF configuration is needed, the controller 236 instructs the victim base station 210 to adjust its operational mode from a first SSF configuration to a second SSF configuration, where the second SSF configuration has more gap symbols than the first SSF configuration. Such an alteration ensures that the UE 202, and others within the victim base station 210, are less likely to experience detrimental TOF interference, thereby maintaining the overall quality of the network connection.

Subsequent to adjusting the SSF configuration of the victim base station 210, the TOF mitigation engine 230 can continue to determine whether TOF interference is taking place. If TOF interference is no longer taking place, the TOF mitigation engine will roll back the changes made to the victim base station 210 SSF configuration. As discussed above, the TOF mitigation engine 230 can be said to comprise a monitor 232, an analyzer 234, and a controller 236. The monitor 232 is generally configured to determine that TOF interference is no longer taking place in the cell in which the victim base station 210. The analyzer is generally configured to determine that the victim base station 210 can return to lower gap symbol SSF configuration because the TOF inference has fallen below the predetermined threshold. The controller 263 is generally configured to modify the SSF configuration of the victim base station 210 from the second SSF configuration to the first SSF configuration.

Figure 4:
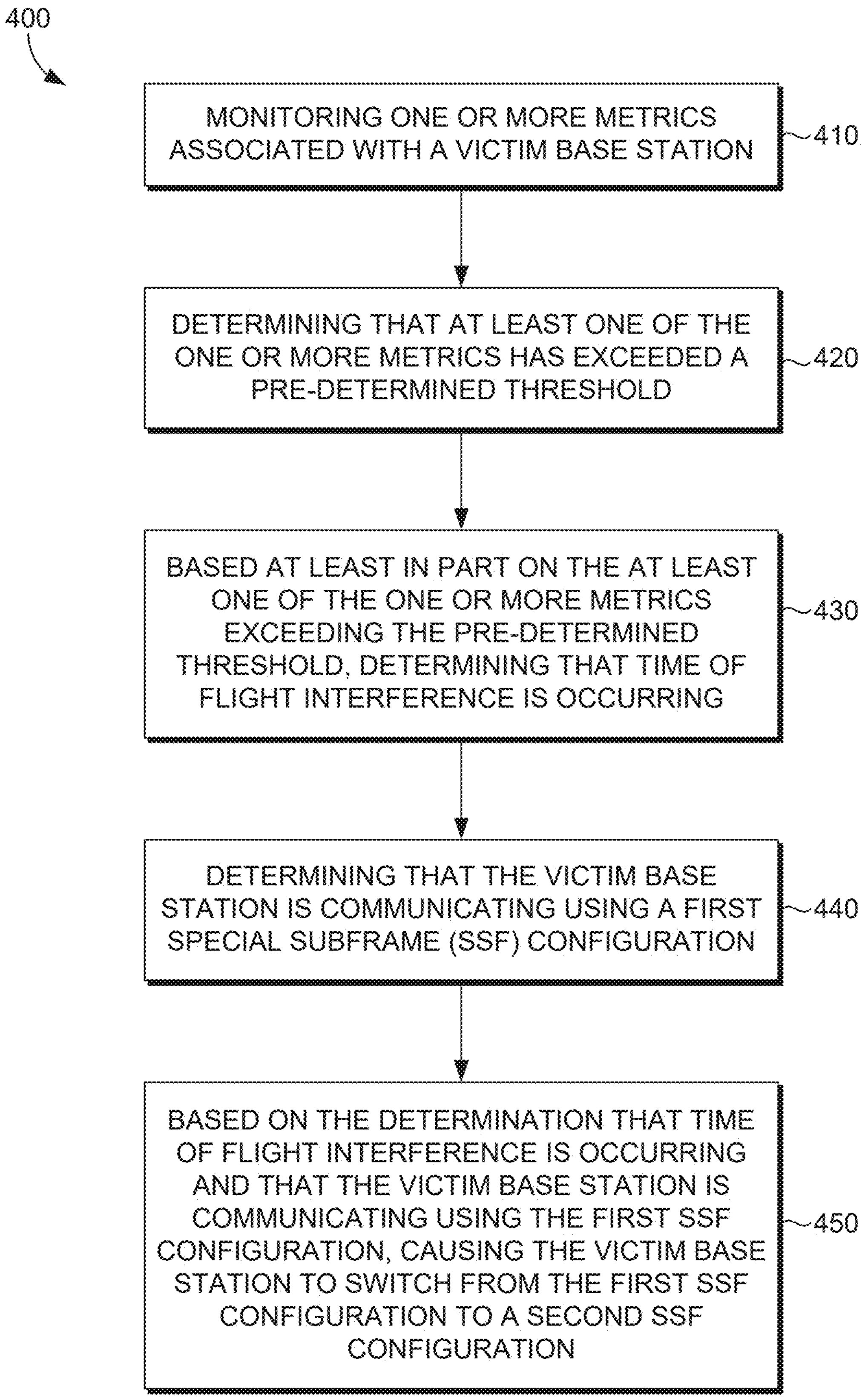
FIG. 4 depicts a flow diagram of an exemplary method for mitigating tropospheric ducting interference in a wireless telecommunication network in accordance with aspects herein.

FIG. 4 depicts a flow diagram of an exemplary method for mitigating tropospheric ducting by adjusting the idle mode cell re-selection priority of a UE 202 in accordance with aspects herein. The method 400 begins with step 410 with monitoring one or more metrics associated with a victim base station, according to any one or more aspects described with respect to FIG. 2. The method 400 continues with step 420 of determining that at least one of the one or more metrics has exceeded a pre-determined threshold, according to any one or more aspects described with respect to FIG. 2. Method 400 continues with step 430 where based at least in part on the at least one of the one or more metrics exceeding the pre-determined threshold, the method 400 determines that time of flight interference is occurring during an uplink symbol of a victim base station, according to any one or more aspects described with respect to FIG. 2. At step 440, the method 400 determines that the victim base station is communicating using a first SSF configuration, according to any one or more aspects described with respect to FIG. 2. At step 450, the method 400, based on the determination that time of flight interference is occurring and that the victim base station is communicating using the first SSF configuration, causes the victim base station to switch from the first SSF configuration to a second SSF configuration, wherein the second SSF configuration comprises more gap symbols than the first SSF configuration, according to any one or more aspects described with respect to FIG. 2.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and can be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in the limiting sense, and the scope of embodiments is defined by the appended claims and their equivalents

The invention claimed is:

1. A method for mitigating interference caused by tropospheric ducting in a wireless telecommunication network, the method comprising:

determining that time-of-flight interference is occurring at a victim base station;

determining that the victim base station is communicating using a first special subframe (SSF) configuration, the first SSF configuration comprising a first number of gap symbols; and based at least in part on the determining that time-of-flight interference is occurring and that the victim base station is communicating using the first SSF configuration, causing the victim base station to switch from the first SSF configuration to a second SSF configuration, the second SSF configuration comprising a second number of gap symbols, wherein the second number of gap symbols exceeds the first number of gap symbols;

wherein the determining that time-of-flight interference is occurring at the victim base station is based in part on monitoring one or more metrics associated with the victim base station and determining that at least one of the one or more metrics has exceeded a pre-determined threshold;

wherein the monitoring of the one or more metrics comprises monitoring an uplink received signal strength indicator (UL RSSI) and an uplink block error rate;

wherein the determining that at least one of the one or more metrics has exceeded the pre-determined threshold comprises determining that the UL RSSI has exceeded a first threshold and that the uplink block error rate has exceeded a second threshold.

2. The method of claim 1, wherein the first SSF configuration comprises 6 downlink symbols, 4 gap symbols, and 6 uplink symbols.

3. The method of claim 1, wherein the second SSF configuration comprises 3 downlink symbols, 8 gap symbols, and 3 uplink symbols.

4. The method of claim 1, further comprising, determining that the time of flight interference occurring at the victim base station fallen below a predetermined threshold.

5. The method of claim 4, further comprising, causing the victim base station to switch from the second SSF configuration to the first SSF configuration, based at least in part on the determining that the time of flight interference occurring at the victim base station fallen below the predetermined threshold.

6. A system for mitigating interference caused by tropospheric ducting in a wireless telecommunication network, the system comprising:

one or more non-transitory computer processing components configured to perform operations comprising:

monitoring one or more metrics associated with a victim base station;

determining that at least one of the one or more metrics has exceeded a pre-determined threshold;

based at least in part on the at least one of the one or more metrics exceeding the pre-determined threshold, determining that time-of-flight interference is occurring at the victim base station;

determining that the victim base station is communicating using a first special subframe (SSF) configuration; and based on the determining that time-of-flight interference is occurring and that the victim base station is communicating using the first SSF configuration, causing the victim base station to switch from the first SSF configuration to a second SSF configuration;

wherein the one or more non-transitory computer processing components are configured to cause the victim base station to switch from the second SSF configuration to the first SSF configuration upon determining that time-of-flight interference has fallen below the pre-determined threshold;

wherein the one or more non-transitory computer processing components are configured to maintain the second SSF configuration for a pre-determined period before causing the victim base station to switch from the second SSF configuration to the first SSF configuration.

7. The system of claim 6, wherein the first SSF configuration comprises a first number of gap symbols and the second SSF configuration comprises a second number of gap symbols.

8. The system of claim 7, wherein the second number of gap symbols exceeds the first number of gap symbols.

9. The system of claim 6, wherein the first SSF configuration comprises 6 downlink symbols, 4 gap symbols, and 4 uplink symbols and the second SSF configuration comprises 3 downlink symbols, 8 gap symbols, and 3 uplink symbols.

10. The system of claim 6, wherein the one or more metrics include at least one metric selected from a group consisting of signal to interference plus noise ratio (SINR), channel quality indicator (CQI), and reference signal received power (RSRP).

11. A non-transitory computer readable media having instructions stored thereon that, when executed by one or more computer processing components, cause the one or more computer processing components to perform a method for mitigating interference caused by tropospheric ducting in a wireless telecommunication network, the method comprising:

determining that at least one of one or more metrics for the wireless telecommunication network has exceeded a pre-determined threshold;

based at least in part on the at least one of the one or more metrics exceeding the pre-determined threshold, determining that time-of-flight interference is occurring at a victim base station;

determining that the victim base station is communicating using a first special subframe (SSF) configuration; and based on the determining that time-of-flight interference is occurring and that the victim base station is communicating using the first SSF configuration, causing the victim base station to switch from the first SSF configuration to a second SSF configuration;

wherein the one or more metrics include an uplink received signal strength indicator (UL RSSI) and an uplink block error rate (BLER);

causing the victim base station to switch from the second SSF configuration to the first SSF configuration upon determining that the one or more metrics has fallen below the pre-determined threshold.

12. The non-transitory computer readable media of claim 11, wherein the first SSF configuration comprises 6 downlink symbols, 4 gap symbols, and 4 uplink symbols and the second SSF configuration comprises 3 downlink symbols, 8 gap symbols, and 3 uplink symbols.

13. The non-transitory computer readable media of claim 11, wherein the first SSF configuration comprises a first number of gap symbols and the second SSF configuration comprises a second number of gap symbols, wherein the second number of gap symbols exceeds the first number of gap symbols.

* * * * *